(12) United States Patent
Tomita et al.

(10) Patent No.: US 10,800,707 B2
(45) Date of Patent: Oct. 13, 2020

(54) MAGNESIA CARBON BRICK AND PRODUCTION METHOD THEREFOR

(71) Applicants: KROSAKIHARIMA CORPORATION, Fukuoka (JP); NIPPON STEEL CORPORATION, Tokyo (JP)

(72) Inventors: Yuya Tomita, Fukuoka (JP); Masato Tanaka, Fukuoka (JP); Shigeto Sawai, Tokyo (JP)

(73) Assignees: KROSAKIHARIMA CORPORATION, Fukuoka (JP); NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/345,386

(22) PCT Filed: Oct. 16, 2017

(86) PCT No.: PCT/JP2017/037396
§ 371 (c)(1),
(2) Date: Apr. 26, 2019

(87) PCT Pub. No.: WO2018/079324
PCT Pub. Date: May 3, 2018

(65) Prior Publication Data
US 2019/0248706 A1  Aug. 15, 2019

(30) Foreign Application Priority Data
Oct. 27, 2016  (JP) .................. 2016-210978

(51) Int. Cl.
*C04B 35/043* (2006.01)
*C04B 35/01* (2006.01)
*F27D 1/00* (2006.01)

(52) U.S. Cl.
CPC .......... *C04B 35/043* (2013.01); *C04B 35/013* (2013.01); *F27D 1/00* (2013.01); *C04B 2235/402* (2013.01); *C04B 2235/424* (2013.01)

(58) Field of Classification Search
CPC ............................... C04B 35/04; C04B 35/043
See application file for complete search history.

(56) References Cited

U.S. PATENT DOCUMENTS

| 8,093,169 B2 * | 1/2012 | Tanaka .................. F27D 1/0006 266/283 |
| 9,522,846 B2 * | 12/2016 | Shiohama ........... C04B 35/0435 |
| 2015/0368159 A1 * | 12/2015 | Shiohama ........... C04B 35/0435 501/101 |

FOREIGN PATENT DOCUMENTS

| JP | 11322405 A | 11/1999 |
| JP | 2007182337 A | 7/2007 |

(Continued)

OTHER PUBLICATIONS

English translation of International Preliminary Report on Patentability dated Apr. 30, 2019 with Written Opinion, for PCTJP2017/037396 filed Oct. 16, 2017.

(Continued)

*Primary Examiner* — Karl E Group
(74) *Attorney, Agent, or Firm* — Paul D. Bianco; Gary S. Winer; Fleit Intellectual Property Law

(57) ABSTRACT

Provided are a magnesia carbon brick which does not include graphite yet has excellent spalling and corrosion resistances, and a method for producing thereof. The brick is obtained by adding an organic binder to a refractory raw material mixture followed by kneading, molding, and heat-treating, wherein the mixture includes total 0.1 to 2.0 mass % of pitch and/or carbon black, total 0.1 to 1.0 mass % of aluminum and/or aluminum alloy, 3.0 to 10.0 mass % of magnesia having particle diameter of less than 0.075 mm, (Continued)

and 87.0 to 96.0 mass % of magnesia having particle diameter of 0.075 to 5 mm; and a mass ratio of magnesia having particle diameter of 1 to 5 mm to that of 0.075 to 1 mm is 1.66 to 2.34; graphite is not included therein; and an apparent porosity thereof after heat-treatment under reductive atmosphere at 1400° C. for 3 hours is 8.0% or less.

7 Claims, 1 Drawing Sheet

(56) References Cited

FOREIGN PATENT DOCUMENTS

| | | |
|---|---|---|
| JP | 2013072090 A | 4/2013 |
| JP | 2015231922 A | 12/2015 |
| JP | 2016141595 A | 8/2016 |

OTHER PUBLICATIONS

International Search Report dated Dec. 18, 2017, for PCTJP2017/037396 filed Oct. 16, 2017.
Written Opinion for PCTJP2017/037396 filed Oct. 16, 2017.

* cited by examiner

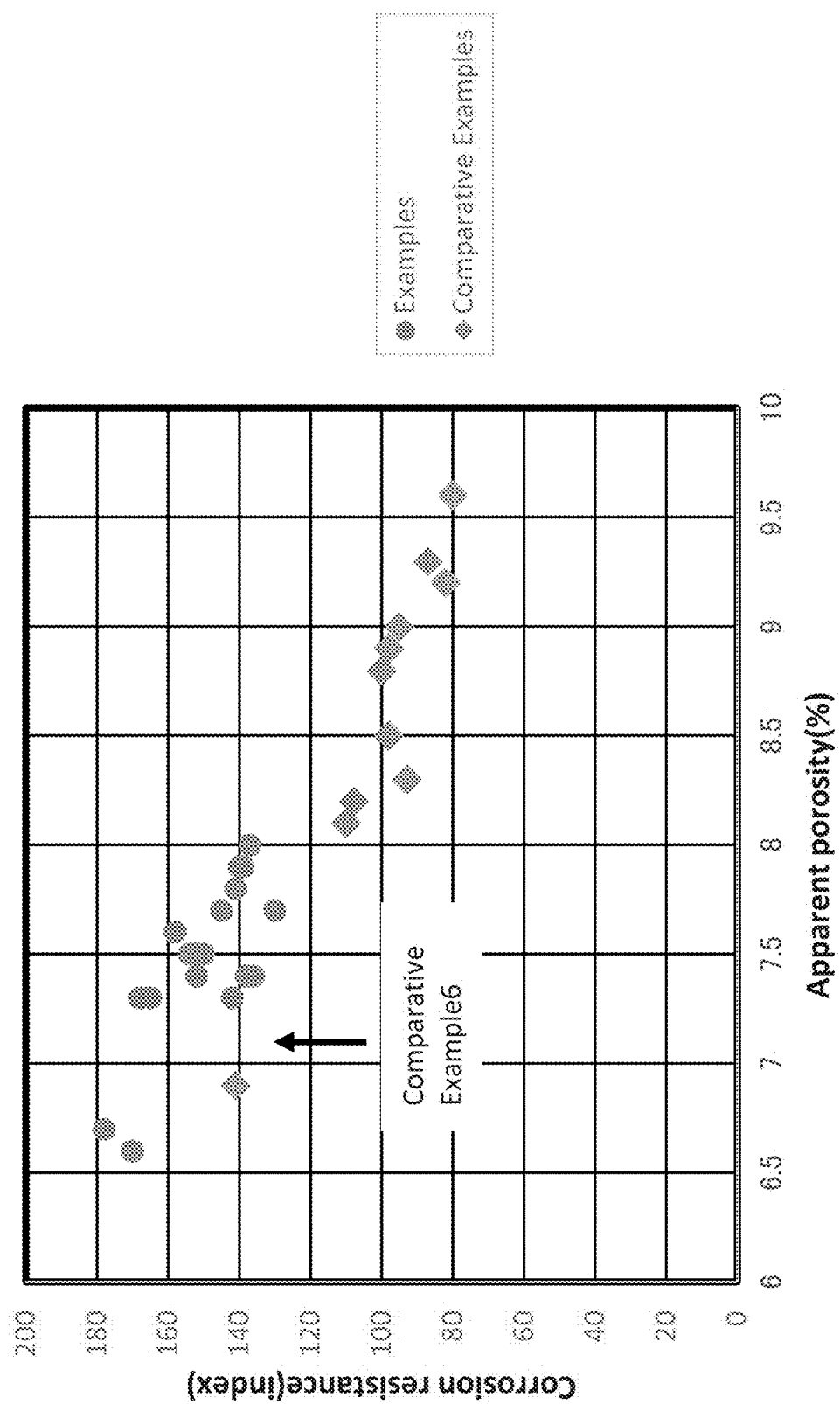

MAGNESIA CARBON BRICK AND PRODUCTION METHOD THEREFOR

TECHNICAL FIELD

The present invention relates to a magnesia carbon brick to be used for a container of a molten metal, a smelting furnace, and the like, as well as to a production method thereof.

BACKGROUND ART

In general, a magnesia carbon brick includes flake graphite as a carbon source, wherein because of the flake graphite included therein a thermal conductivity thereof is so high that there is a problem of heat loss due to heat dissipation of a molten metal as well as a problem of carbon pickup. In addition, when this is used under an oxidative atmosphere in a converter furnace, a secondary smelting facility, or the like, a slug component infiltrates into a pore which is formed by loss of graphite due to oxidation so that dissolution of an aggregate is facilitated; and thus, there is also a problem of an insufficient corrosion resistance.

In view of these problems, it is preferable that the magnesia carbon brick do not include the flake graphite; however, if the flake graphite is not included therein, there occurs a problem of decrease in a spalling resistance.

Accordingly, various methods have been proposed to suppress the decrease in the spalling resistance caused by absence of the flake graphite. For example, Patent Document 1 proposes a method in which an organic binder, a pitch, or a carbon black is used singly or as a mixture of them as an alternative carbon source of the flake graphite. It is described therein that when this method is used, an excellent spalling resistance can be retained because sintering does not take place excessively (increase in an elastic modulus is suppressed) even if the brick having a dense structure is used at a high temperature for a long period of time. Further, in Example 9 thereof, a magnesia alumina refractory brick not including the flake graphite but including a phenol resin as a binder, 1% by mass of a pitch, and 1% by mass of a carbon black is disclosed. However, according to the study of the inventors of the present invention, even if the method of Patent Document 1 was simply applied to the magnesia carbon brick, it was found that there were problems of forming crack and so forth due to spalling when this was used in a RH degassing furnace or the like.

In Patent Document 2, in view of the spalling resistance, it is indicated preferable that an occupancy rate of the particles having a particle diameter of more than 10 µm and 500 µm or less in the magnesia raw material be 20 to 50% by mass relative to the refractory raw material mixture, and that a fine particle portion in the magnesia raw material, especially the portion having a particle diameter of 10 µm or less, be not used or be small if any.

Further, Patent Document 3 discloses the magnesia carbon brick, wherein in the refractory raw material mixture the mass ratio of the magnesia particle having the particle diameter of 1 mm or more to the magnesia particle having the particle diameter of less than 1 mm is 1.27 or more and 2.58 or less, as well as the blending amount of graphite in total of magnesia and graphite is 10% or less by mass. In addition, in Patent Document 3, it is described as follows. Namely, "this magnesia carbon brick includes more coarse particles as compared with a general magnesia carbon brick so that the spalling resistance thereof is good in spite of a small blending amount of graphite. However, in the case of a small blending amount of the graphite such as, for example, 6% or less by mass, the spalling resistance thereof is sometimes insufficient depending on the use condition thereof. In such a case, it is preferable to blend therein a carbon black or a pitch whose softening temperature is 70° C. or higher and 370° C. or lower. These raw materials have the effect to improve the spalling resistance of the magnesia carbon brick. The addition amount of these raw materials is not particularly restricted, but the total amount of these raw materials is preferably 0.5% or more by mass and 4% or less by mass as an outer percentage relative to the total amount of magnesia and graphite in the refractory raw material mixture."

Both Patent Documents 2 and 3 disclose the examples in which the refractory raw material mixture includes graphite. However, when the inventors of the present invention produced the unfired magnesia brick not including graphite by using the refractory raw material mixture in which only graphite was excluded from these refractory raw material mixtures, the spalling resistance and the corrosion resistance thereof were insufficient.

CITATION LIST

Patent Documents

Patent Document 1: Japanese Patent Laid-Open Publication No. H11-322405
Patent Document 2: Japanese Patent Laid-Open Publication No. 2007-182337
Patent Document 3: Japanese Patent Laid-Open Publication No. 2013-72090

SUMMARY OF THE INVENTION

Problems to be Solved by the Invention

The problems to be solved by the present invention are to provide a magnesia carbon brick which does not include graphite yet has excellent spalling resistance and corrosion resistance, as well as to provide a method for producing thereof.

Means for Solving the Problems

The inventors of the present invention found that in the refractory raw material mixture of the magnesia carbon brick not including graphite, when a pitch and/or a carbon black and aluminum and/or aluminum alloy were used with the amounts thereof being in specific respective ranges, and moreover, a mass ratio of the magnesia having the particle diameter of 1 mm or more and less than 5 mm to the magnesia having the particle diameter of 0.075 mm or more and less than 1 mm was made to 1.66 or more and 2.34 or less, both densification and decrease in the elastic modulus after heat-treatment could be satisfied simultaneously. In addition, the inventors found that the magnesia carbon brick having excellent spalling resistance and corrosion resistance could be obtained when it was used in an actual furnace.

Namely, according to the present invention, the magnesia carbon brick of following (1) to (6) and the production method of the magnesia carbon brick of following (7) can be provided.

(1) A magnesia carbon brick, the magnesia carbon brick being obtained by adding an organic binder to a refractory raw material mixture followed by kneading, molding, and heat-treating, wherein in the refractory raw material mixture, a pitch and/or a carbon black is included with a total amount of 0.1% or more by mass and 2.0% or less by mass, aluminum and/or aluminum alloy is included with a total amount of 0.1% or more by mass and 1.0% or less by mass, a magnesia having a particle diameter of less than 0.075 mm is included with an amount of 3.0% or more by mass and 10.0% or less by mass, and a magnesia having a particle diameter of 0.075 mm or more and less than 5 mm is included with an amount of 87.0% or more by mass and 96.0% or less by mass, but graphite is not included therein; and a mass ratio of a magnesia having a particle diameter of 1 mm or more and less than 5 mm to a magnesia having a particle diameter of 0.075 mm or more and less than 1 mm is 1.66 or more and 2.34 or less;

and an apparent porosity thereof after having been subjected to a heat-treatment under a reductive atmosphere at 1400° C. for 3 hours is 8.0% or less.

(2) The magnesia carbon brick according to (1), wherein in the refractory raw material mixture, both the pitch and the carbon black are used together.

(3) The magnesia carbon brick according to (1) or (2), wherein in the refractory raw material mixture, the pitch and/or the carbon black is included with a total amount of 0.2% or more by mass and 1.4% or less by mass.

(4) The magnesia carbon brick according to any one of (1) to (3), wherein in the refractory raw material mixture, the aluminum and/or the aluminum alloy is included with a total amount of 0.1% or more by mass and 0.7% or less by mass.

(5) The magnesia carbon brick according to any one of (1) to (4), wherein in the refractory raw material mixture, the mass ratio of the magnesia having the particle diameter of 1 mm or more and less than 5 mm to the magnesia having the particle diameter of 0.075 mm or more and less than 1 mm is 1.85 or more and 2.20 or less.

(6) The magnesia carbon brick according to any one of (1) to (5), wherein in the refractory raw material mixture, silicon is used with a total amount including the aluminum and/or the aluminum alloy being 0.2% or more by mass and 1.0% or less by mass.

(7) A method for producing a magnesia carbon brick, wherein an organic binder is added to a refractory raw material mixture followed by kneading, molding, and heat-treating, the refractory raw material mixture including, without including graphite, a pitch and/or a carbon black with a total amount of 0.1% or more by mass and 2.0% or less by mass, aluminum and/or aluminum alloy with a total amount of 0.1% or more by mass and 1.0% or less by mass, and a magnesia having a particle diameter of less than 0.075 mm with an amount of 3.0% or more by mass and 10.0% or less by mass, and a magnesia having a particle diameter of 0.075 mm or more and less than 5 mm with an amount of 87.0% or more by mass and 96.0% or less by mass; and a mass ratio of a magnesia having the particle diameter of 1 mm or more and less than 5 mm to a magnesia having the particle diameter of 0.075 mm or more and less than 1 mm is 1.66 or more and 2.34 or less.

Here, the term "particle diameter" used in the present invention means a sieve mesh at the time when the refractory raw material particles are separated by sieving. Therefore, for example, the magnesia having the particle diameter of less than 0.075 mm means the one which passes through a sieve mesh of 0.075 mm; and the magnesia having the particle diameter of 0.075 mm or more means the one which does not pass through a sieve mesh of 0.075 mm.

Hereinafter, the composition of the refractory raw material mixture, which is the characteristic of the present invention, will be explained.

In order to lower the elastic modulus of the brick thereby enhance the spalling resistance thereof, amount of the pitch and/or the carbon black to be used is made to 0.1% or more by mass and 2.0% or less by mass, while preferably 0.2% or more by mass and 1.4% or less by mass. When the amount of the pitch and/or the carbon black is less than 0.1% by mass, enhancement of the spalling resistance is insufficient; and when the amount thereof is more than 2.0% by mass, porosity becomes so high that the corrosion resistance is decreased.

In the present invention, the spalling resistance and the corrosion resistance of the brick were evaluated by the measurement values of an apparent porosity and a sonic velocity elastic modulus after the brick is subjected to a heat-treatment under a reductive atmosphere at 1400° C. for 3 hours. Both the apparent porosity and the sonic velocity elastic modulus of the brick described below are the measurement values obtained after the brick is subjected to a heat-treatment under a reductive atmosphere at 1400° C. for 3 hours. In addition, the apparent porosity is also called simply "porosity", and the sonic velocity elastic modulus is also called simply "elastic modulus".

In the refractory raw material mixture of the present invention, in order to protect from oxidation and to densify the structure, amount of the aluminum and/or the aluminum alloy to be used is made to 0.1% or more by mass and 1.0% or less by mass, while preferably 0.1% or more by mass and 0.7% or less by mass. When the amount of the aluminum and/or the aluminum alloy is more than 1.0% by mass, an expansion takes place due to reaction of aluminum during its use, and moreover pores are formed due to melting and evaporation of the aluminum and/or the aluminum alloy, so that the porosity increases thereby resulting in an insufficient corrosion resistance. When the amount of the aluminum and/or the aluminum alloy is less than 0.1% by mass, the densification effect of the structure is insufficient so that the porosity increases thereby leading to a decrease in the corrosion resistance. The densification effect of the structure can be expressed further eminently by using the aluminum and/or the aluminum alloy having fine particle diameter, for example, less than 0.075 mm.

The refractory raw material mixture of the present invention does not include graphite. Therefore, especially the mixture blended with a small amount of the carbon source powder lacks a sliding effect of the graphite in the raw material particles during the time of molding so that the filling property thereof is deteriorated. Accordingly, because the magnesia having the particle diameter of less than 0.075 mm can significantly influence to the filling property during the time of molding and further to the sintering property during the use time, control of the amount thereof is very important. Namely, in the refractory raw material mixture, when amount of the magnesia having the particle diameter of less than 0.075 mm is less than 3.0% by mass, voids in the brick's structure is not sufficiently filled up thereby leading to an increase in the porosity. When the amount of the magnesia having the particle diameter of less than 0.075 mm is more than 10.0% by mass, the filling property after molding becomes poor thereby leading to an increase in the porosity; and moreover, because of a large amount of the fine powders, sintering is facilitated thereby leading to an increase in the elastic modulus. In order to obtain a sufficient corrosion resistance, the magnesia having the particle diameter of 0.075 mm or more and less than 5 mm is used with the amount of 87.0% or more by mass and 96.0% or less by mass.

In the refractory raw material mixture, when the mass ratio of the magnesia having the particle diameter of 1 mm or more and less than 5 mm to the magnesia having the particle diameter of 0.075 mm or more and less than 1 mm (mass of the magnesia having the particle diameter of 1 mm or more and less than 5 mm/mass of the magnesia having the particle diameter of 0.075 mm or more and less than 1 mm) is made to 1.66 or more and 2.34 or less, a low porosity and a low elastic modulus can be obtained; and furthermore, when the mass ratio is made to 1.85 or more and 2.20 or less, a further lower porosity and a further lower elastic modulus can be obtained. When the mass ratio is less than 1.66, the porosity and the elastic modulus are too high; and when the mass ratio is more than 2.34, the porosity is too high. In general, when the structure is densified, the elastic modulus increases. However, the inventors of the present invention found that when the mass ratio was made in the range of 1.66 or more and 2.34 or less, both the densification of the structure and the decrease in the elastic modulus could be satisfied simultaneously.

Accordingly, because the structure of the magnesia carbon brick of the present invention is densified, the apparent porosity thereof after having been subjected to the heat-treatment under a reductive atmosphere at 1400° C. for 3 hours is 8.0% or less. Therefore, the magnesia carbon brick having an extremely good corrosion resistance can be obtained.

In the refractory raw material mixture of the present invention, with an aim to attain a further densification effect of the structure, silicon (metal silicon) may be added. The addition amount thereof is sufficient with 0.2% or more by mass and 1.0% or less by mass as a total amount with aluminum and/or aluminum alloy, or 0.5% or less by mass when it is alone. When fine silicon having the particle diameter of less than 0.045 mm is used, the densification effect of the structure can be expressed further eminently. When the addition amount is more than this amount, low-melting point substances are increasingly formed in the magnesia carbon brick thereby causing deterioration of the corrosion resistance and leading to a decrease in the durability thereof.

Advantageous Effects of Invention

The magnesia carbon brick of the present invention does not include graphite, and yet has excellent spalling resistance and corrosion resistance, so that this can be used without problems in a converter furnace, a secondary smelting facility, and the like. As a result, not only heat loss and carbon pickup can be suppressed but also durability of the furnace can be improved.

BRIEF DESCRIPTION OF THE DRAWING

The Figure illustrates a relationship between the corrosion resistance of the magnesia carbon brick and the apparent porosity thereof after having been subjected to the heat-treatment under a reductive atmosphere at 1400° C. for 3 hours.

DESCRIPTION OF THE EMBODIMENTS

The magnesia to be used in the refractory raw material mixture in the present invention may be any one of a fused magnesia and a sintered magnesia or both. The composition thereof is not particularly restricted; however, in order to obtain a further enhanced corrosion resistance, magnesia having a high MgO purity may be used. Therefore, the MgO purity may be for example, 96% or more, or even 98% or more.

The pitch and the carbon black are used to enhance the spalling resistance, wherein those generally used in the magnesia carbon brick or the like may be used without problems. The pitch may be used as powders or as a solution obtained by dissolving it in a solvent.

Aluminum, aluminum alloy, and silicon are used in order to enhance the oxidation resistance as well as to densify the structure, wherein those generally used in the magnesia carbon brick or the like may be used without problems.

Other than magnesia, pitch and/or carbon black, aluminum and/or aluminum alloy, and silicon, a raw material generally used as the raw material of the magnesia carbon brick may be used without an adverse effect so far as the amount thereof is 5% or less by mass. Specifically, a metal other than aluminum, aluminum alloy, and silicon, as well as fibers, glasses, and the like may be used.

The magnesia carbon brick of the present invention may be produced by a general method for producing a magnesia carbon brick. Namely, the magnesia carbon brick of the present invention may be obtained by adding an organic binder to the refractory raw material mixture followed by kneading, molding, and heat-treating.

With regard to the organic binder, organic binders used in a usual magnesia carbon brick may be used; for example, a furan resin, a phenol resin, or the like may be used. In addition, the organic binder may be used in any form such as a powder form, a liquid form in which the binder is dissolved in a suitable solvent, or a mixed form of the liquid form and the powder form. The methods and conditions of kneading, molding, and heat-treating each follow those used in general production methods of the magnesia carbon brick. For example, the heat-treatment temperature may be made in the range of 150 to 400° C.

The magnesia carbon brick of the present invention obtained in the way as described above can be used as a lining material of a furnace for treatment of a molten metal, such as a converter furnace, an electric furnace, a ladle, or a vacuum degassing furnace. This brick is especially suitable for the use in which carbon pickup is problematic, therefore, for the use in a vacuum degassing furnace such as RH.

EXAMPLES

An appropriate amount of a phenol resin was added as the organic binder to the refractory raw material mixture described in Table 1 for Examples 1-18 and Table 2 for the Comparative Examples. Next, after the mixture thus obtained was kneaded and then molded by an oil press to a shape of 230 mm×114 mm×100 mm, it was subjected to a heat-treatment (drying treatment) at the maximum temperature of 250° C. with a holding period of 5 hours. From this, specimens for measurements of physical properties were cut out, and then, the apparent porosity and the sonic velocity elastic modulus were measured; and also the corrosion resistance was evaluated.

TABLE 1

|  |  | Example | | | | | |
| --- | --- | --- | --- | --- | --- | --- | --- |
|  |  | 1 | 2 | 3 | 4 | 5 | 6 |
| Magnesia | 1 mm or more and less than 5 mm | 61.0 | 61.0 | 61.0 | 56.3 | 58.3 | 61.3 |
|  | 0.075 mm or more and less than 1 mm | 34.5 | 29.5 | 27.5 | 34.0 | 32.0 | 29.0 |
|  | Total of 0.075 mm or more and less than 5 mm | 95.5 | 90.5 | 88.5 | 90.3 | 90.3 | 90.3 |
|  | Less than 0.075 mm | 3.0 | 8.0 | 10.0 | 8.0 | 8.0 | 8.0 |
|  | Carbon black | 0.5 | 0.5 | 0.5 | 0.5 | 0.5 | 0.5 |
|  | Pitch | 0.5 | 0.5 | 0.5 | 0.5 | 0.5 | 0.5 |
|  | Al (particle diameter: less than 0.075 mm) | 0.5 | 0.5 | 0.5 | 0.5 | 0.5 | 0.5 |
|  | Al—Mg alloy (particle diameter: less than 0.075 mm) |  |  |  |  |  |  |
|  | Si (particle diameter: less than 0.045 mm) |  |  |  | 0.2 | 0.2 | 0.2 |
|  | $B_4C$ |  |  |  |  |  |  |
|  | Total of components | 100.0 | 100.0 | 100.0 | 100.0 | 100.0 | 100.0 |
|  | Mass ratio of magnesia having particle diameter of 1 mm or more and less than 5 mm to magnesia having particle diameter of 0.075 mm or more and less than 1 mm | 1.77 | 2.07 | 2.22 | 1.66 | 1.82 | 2.11 |
|  | Total of Si, Al, and Al alloy | 0.5 | 0.5 | 0.5 | 0.7 | 0.7 | 0.7 |
|  | Apparent porosity % | 7.9 | 7.7 | 7.5 | 7.6 | 7.4 | 7.3 |
|  | Sonic velocity elastic modulus/Gpa | 36 | 42 | 48 | 58 | 57 | 55 |
|  | Corrosion resistance index | 140 | 145 | 150 | 152 | 158 | 165 |

|  |  | Example | | | | | |
| --- | --- | --- | --- | --- | --- | --- | --- |
|  |  | 7 | 8 | 9 | 10 | 11 | 12 |
| Magnesia | 1 mm or more and less than 5 mm | 62.3 | 63.3 | 62.0 | 61.3 | 61.3 | 60.1 |
|  | 0.075 mm or more and less than 1 mm | 28.0 | 27.0 | 29.2 | 29.0 | 29.0 | 29.2 |
|  | Total of 0.075 mm or more and less than 5 mm | 90.3 | 90.3 | 91.2 | 90.3 | 90.3 | 89.3 |
|  | Less than 0.075 mm | 8.0 | 8.0 | 8.0 | 8.0 | 8.0 | 8.0 |
|  | Carbon black | 0.5 | 0.5 | 0.1 | 1.0 |  | 1.0 |
|  | Pitch | 0.5 | 0.5 |  |  | 1.0 | 1.0 |
|  | Al (particle diameter: less than 0.075 mm) | 0.5 | 0.5 | 0.5 | 0.5 | 0.5 | 0.5 |
|  | Al—Mg alloy (particle diameter: less than 0.075 mm) |  |  |  |  |  |  |
|  | Si (particle diameter: less than 0.045 mm) | 0.2 | 0.2 | 0.2 | 0.2 | 0.2 | 0.2 |
|  | $B_4C$ |  |  |  |  |  |  |
|  | Total of components | 100.0 | 100.0 | 100.0 | 100.0 | 100.0 | 100.0 |
|  | Mass ratio of magnesia having particle diameter of 1 mm or more and less than 5 mm to magnesia having particle diameter of 0.075 mm or more and less than 1 mm | 2.23 | 2.34 | 2.12 | 2.11 | 2.11 | 2.06 |
|  | Total of Si, Al, and Al alloy | 0.7 | 0.7 | 0.7 | 0.7 | 0.7 | 0.7 |
|  | Apparent porosity % | 7.3 | 7.5 | 7.3 | 7.4 | 7.4 | 7.7 |
|  | Sonic velocity elastic modulus/Gpa | 55 | 52 | 72 | 57 | 56 | 58 |
|  | Corrosion resistance index | 168 | 154 | 142 | 138 | 136 | 130 |

|  |  | Example | | | | | |
| --- | --- | --- | --- | --- | --- | --- | --- |
|  |  | 13 | 14 | 15 | 16 | 17 | 18 |
| Magnesia | 1 mm or more and less than 5 mm | 61.9 | 61.7 | 61.3 | 61.0 | 60.9 | 60.6 |
|  | 0.075 mm or more and less than 1 mm | 29.0 | 29.0 | 29.0 | 29.0 | 29.0 | 29.0 |
|  | Total of 0.075 mm or more and less than 5 mm | 90.9 | 90.7 | 90.3 | 90.0 | 89.9 | 89.6 |
|  | Less than 0.075 mm | 8.0 | 8.0 | 8.0 | 8.0 | 8.0 | 8.0 |
|  | Carbon black | 0.5 | 0.5 | 0.5 | 0.5 | 0.5 | 0.5 |
|  | Pitch | 0.5 | 0.5 | 0.5 | 0.5 | 0.7 | 0.7 |
|  | Al (particle diameter: less than 0.075 mm) | 0.1 | 0.3 | 0.7 | 1.0 | 0.5 |  |
|  | Al—Mg alloy (particle diameter: less than 0.075 mm) |  |  |  |  |  | 0.5 |
|  | Si (particle diameter: less than 0.045 mm) |  |  |  |  | 0.2 | 0.2 |
|  | $B_4C$ |  |  |  |  | 0.2 | 0.5 |
|  | Total of components | 100.0 | 100.0 | 100.0 | 100.0 | 100.0 | 100.0 |
|  | Mass ratio of magnesia having particle diameter of 1 mm or more and less than 5 mm to magnesia having particle diameter of 0.075 mm or more and less than 1 mm | 2.13 | 2.13 | 2.11 | 2.10 | 2.10 | 2.09 |
|  | Total of Si, Al, and Al alloy | 0.1 | 0.3 | 0.7 | 1.0 | 0.7 | 0.7 |
|  | Apparent porosity % | 7.9 | 7.8 | 7.5 | 8.0 | 6.6 | 6.7 |
|  | Sonic velocity elastic modulus/Gpa | 30 | 38 | 46 | 65 | 62 | 73 |
|  | Corrosion resistance index | 139 | 141 | 152 | 137 | 170 | 178 |

TABLE 2

| | | Comparative Example | | | | | |
|---|---|---|---|---|---|---|---|
| | | 1 | 2 | 3 | 4 | 5 | 6 |
| Magnesia | 1 mm or more and less than 5 mm | 62.0 | 57.0 | 57.0 | 51.0 | 65.3 | 62.3 |
| | 0.075 mm or more and less than 1 mm | 34.0 | 28.0 | 26.5 | 39.3 | 25.0 | 29.0 |
| | Total of 0.075 mm or more and less than 5 mm | 96.0 | 85.0 | 83.5 | 90.3 | 90.3 | 91.3 |
| | Less than 0.075 mm | 1.0 | 10.0 | 15.0 | 8.0 | 8.0 | 8.0 |
| Flake graphite % | | | | | | | |
| Carbon black % | | 1.0 | 1.0 | 0.5 | 0.5 | 0.5 | 0.0 |
| Pitch % | | 1.0 | 1.0 | 0.5 | 0.5 | 0.5 | 0.0 |
| Al (particle diameter: less than 0.075 mm) % | | 0.5 | 1.0 | 0.5 | 0.5 | 0.5 | 0.5 |
| Si (particle diameter: less than 0.045 mm) % | | 0.5 | 1.0 | | 0.2 | 0.2 | 0.2 |
| $B_4C$ | | | 1.0 | | | | |
| Total of components | | 100.0 | 100.0 | 100.0 | 100.0 | 100.0 | 100.0 |
| Mass ratio of magnesia having particle diameter of 1 mm or more and less than 5 mm to magnesia having particle diameter of 0.075 mm or more and less than 1 mm | | 1.82 | 2.04 | 2.15 | 1.30 | 2.61 | 2.15 |
| Total of Si, Al, and Al alloy | | 1.0 | 2.0 | 0.5 | 0.7 | 0.7 | 0.7 |
| Apparent porosity % | | 8.8 | 8.2 | 9.0 | 8.1 | 8.9 | 6.9 |
| Sonic velocity elastic modulus/Gpa | | 31 | 90 | 95 | 98 | 56 | 7 |
| Corrosion resistance index | | 100 | 108 | 95 | 110 | 98 | 141 |

| | | Comparative Example | | | | |
|---|---|---|---|---|---|---|
| | | 7 | 8 | 9 | 10 | 11 |
| Magnesia | 1 mm or more and less than 5 mm | 56.0 | 61.6 | 60.4 | 62.2 | 62.2 |
| | 0.075 mm or more and less than 1 mm | 34.0 | 29.0 | 29.0 | 29.0 | 29.0 |
| | Total of 0.075 mm or more and less than 5 mm | 90.0 | 90.6 | 89.4 | 91.2 | 91.2 |
| | Less than 0.075 mm | 7.0 | 8.0 | 8.0 | 6.0 | 4.0 |
| Flake graphite % | | | | | 1.0 | 3.0 |
| Carbon black % | | 1.2 | 0.7 | 0.7 | 0.5 | 0.5 |
| Pitch % | | 1.0 | 0.7 | 0.7 | 0.6 | 0.6 |
| Al (particle diameter: less than 0.075 mm) % | | 0.5 | 0.0 | 1.2 | 0.5 | 0.5 |
| Si (particle diameter: less than 0.045 mm) % | | 0.2 | | | 0.2 | 0.2 |
| $B_4C$ | | | | | | |
| Total of components | | 100.0 | 100.0 | 100.0 | 100.0 | 100.0 |
| Mass ratio of magnesia having particle diameter of 1 mm or more and less than 5 mm to magnesia having particle diameter of 0.075 mm or more and less than 1 mm | | 1.65 | 2.12 | 2.08 | 2.14 | 2.14 |
| Total of Si, Al, and Al alloy | | 0.7 | 0.0 | 1.2 | 0.7 | 0.7 |
| Apparent porosity % | | 9.3 | 9.6 | 9.2 | 8.5 | 8.3 |
| Sonic velocity elastic modulus/Gpa | | 34 | 24 | 84 | 36 | 24 |
| Corrosion resistance index | | 87 | 80 | 82 | 98 | 93 |

In the measurement of the apparent porosity, a specimen with the shape of 50×50×50 mm was buried in a coke breeze; then, after it was heated to 1400° C. in an electric furnace and held at this temperature for 3 hours, it was allowed to be cooled naturally. Thereafter, the apparent porosity was measured according to JIS R 2205 using kerosene as the solvent. It is judged that as the porosity is lower, the brick is denser thereby more effective in enhancement of the corrosion resistance.

In measurement of the sonic velocity elastic modulus, in the same way as measurement of the apparent porosity, a specimen with the shape of 20×20×80 mm was buried in a coke breeze; then, after it was heated to 1400° C. in an electric furnace and held at this temperature for 3 hours, it was allowed to be cooled naturally. Thereafter, the elastic modulus was obtained by measuring a sonic velocity in a direction not having been applied with a pressure at the time of molding the specimen. The spalling resistance was judged to be good when the elastic modulus was 72 GPa or less.

The corrosion resistance was evaluated with a rotary corrosion test. In the rotary corrosion test, an inner surface of a drum having a horizontal rotation axis was treated with a sample brick for lining. A slug was charged into the drum and then heated to corrode a surface of the brick. An oxygen-propane burner was used as a heating source with the testing temperature of 1700° C.; the slug composition was 30% by mass of CaO, 30% by mass of $SiO_2$, 20% by mass of $Al_2O_3$, and 20% mass of $FeO+Fe_2O_3$, wherein charging and discharging of the slug were repeated every 30 minutes for 10 times. After the test, the maximum size of the eroded part of every brick (remained size of the brick) was measured; and the corrosion resistance was expressed as the corrosion resistance index in which the remained size of the brick in "Comparative Example 1" of Table 2 was regarded as 100, indicating that the corrosion resistance is better as the corrosion resistance index is higher.

In Example 1 to Example 3, content of the magnesia having the particle diameter of less than 0.075 mm in the refractory raw material mixture was changed within the range of the present invention. In all of them, the apparent porosity was low, the corrosion resistance was good, and the elastic modulus was low.

On the other hand, in Comparative Example 1, content of the magnesia having the particle diameter of less than 0.075 mm was 1.0% by mass, i.e., lower than the lower limit value thereof, thereby leading to the void with insufficient filling;

thus, the apparent porosity was increased and the corrosion resistance was decreased. In Comparative Example 2, the magnesia having the particle diameter of 0.075 mm or more and less than 5 mm was 85.0% by mass, i.e., lower than the lower limit value thereof, thereby leading to a decrease in the filling property after molding; thus, the apparent porosity was increased and the corrosion resistance was decreased. In Comparative Example 3, the magnesia having the particle diameter of less than 0.075 mm was 15.0% by mass, i.e., higher than the upper limit value thereof, and the magnesia having the particle diameter of 0.075 mm or more and less than 5 mm was 83.5% by mass, i.e., lower than the lower limit value thereof, thereby leading to a decrease in the filling property after molding; thus, the apparent porosity was increased and the corrosion resistance was decreased. In addition, content of the fine powders having the particle diameter of less than 0.075 mm was so large that the sintering was facilitated thereby leading to an increase in the elastic modulus.

In Example 4 to Example 8, the mass ratio of the magnesia having the particle diameter of 1 mm or more and less than 5 mm to the magnesia having the particle diameter of 0.075 mm or more and less than 1 mm was changed within the range of the present invention. In all of them, the apparent porosity was low, the corrosion resistance was good, and the elastic modulus was low and kept properly. In addition, in Example 4 to Example 8, silicon was added so that the porosity was further decreased. Namely, when comparing Example 2 and Example 6, both having about the same mass ratio, in Example 6 in which silicon was added, the apparent porosity was lower and the corrosion resistance was higher. In addition, in Examples 4 and 8, the mass ratios were 1.66 and 2.34, respectively, i.e., outside the preferred range (1.85 or more and 2.20 or less), so that the porosities thereof were slightly higher than those of Examples 5 to 7.

On the other hand, the mass ratio in Comparative Example 4 was 1.30, i.e., lower than the lower limit value thereof, so that the porosity was increased thereby leading to a decrease in the corrosion resistance and a significant increase in the elastic modulus. The mass ratio in Comparative Example 5 was 2.61, i.e., higher than the upper limit value thereof, so that the porosity was significantly increased thereby leading to a decrease in the corrosion resistance.

In Example 9 to Example 12, addition amount of the pitch and/or the carbon black was changed within the range of the present invention. In all of them, the apparent porosity was low, the corrosion resistance was good, and the elastic modulus was low. In Example 10 only the carbon black with the amount of 1% by mass was added, and in Example 11 only the pitch with the amount of 1% by mass was added; in these Examples, the porosity was slightly higher and also the elastic modulus was higher, as compared with Example 6 in which the carbon black and the pitch were added with the amount of 0.5% by mass each. However, in Example 10 and Example 11, the increase in the porosity was suppressed by adding 0.2% by mass of silicon.

On the other hand, in Comparative Example 6, the carbon black and the pitch were not added, so that the elastic modulus was significant increased. In Comparative Example 7, the total addition amount of the carbon black and the pitch was 2.3% by mass, i.e., higher than the upper limit value thereof of the present invention, so that the porosity was significantly increased thereby leading to a decrease in the corrosion resistance.

In Example 13 to Example 16, addition amount of aluminum was changed within the range of the present invention; and thus, the apparent porosity was low, the corrosion resistance was increased, and the elastic modulus was decreased. In Example 6 in which aluminum and silicon were added with the total amount of 0.7% by mass, the porosity was lower thereby leading to an increase in the corrosion resistance as compared with Example 15 in which only aluminum was added with the amount of 0.7% by mass. In Example 16, addition amount of aluminum was 1.0% by mass. i.e., outside the preferred range (0.1% or more by mass and 0.7%, or less by mass), so that the porosity was slightly higher than those of Examples 13 to 15.

On the other hand, in Comparative Example 8 in which aluminum was not added, the structure was not densified so that the apparent porosity was increased thereby leading to a decrease in the corrosion resistance. In Comparative Example 9 in which addition amount of aluminum was 1.2% by mass, i.e., higher than the upper limit value thereof of the present invention; and thus, the porosity was increased so that the corrosion resistance was decreased and the elastic modulus was increased.

In Example 17 in which 0.2% by mass of silicon and 0.2% by mass of boron carbide as an antioxidant were added, and in Example 18 in which 0.2%, by mass of silicon, 0.5% by mass of an Al—Mg alloy (Al content of 50% by mass), and 0.5% by mass of boron carbide as an antioxidant were added. In these Examples, a further decrease in the porosity as well as an increase in the corrosion resistance could be achieved as compared with Example 5.

In Comparative Example 10 and Comparative Example 11 in which the flake graphite was added 1.0% by mass and 3.0% by mass, respectively, the porosities were higher so that the corrosion resistances were lower, as compared with all the Examples.

The side wall of a lower vessel of RH was treated with the brick of Example 6 or the brick of Comparative Example 4 for lining, and then, they were used for 350 times (ch) each; thereafter, the bricks after having been used were recovered and checked. In the brick of Example 6, there were no cracks, indicating that this was used very well with the erosion loss rate of 1.1 mm/ch. In the brick of Comparative Example 4, there were cracks and exfoliation with the erosion loss rate of 2.3 mm/ch.

In FIG. 1, a relationship is shown between the corrosion resistance of the magnesia carbon bricks of Examples and Comparative Examples and the apparent porosity thereof after having been subjected to the heat-treatment under a reductive atmosphere at 1400° C. for 3 hours. It can be seen that in the magnesia carbon bricks of Examples, the apparent porosities were 8.0% or less thereby having good corrosion resistances. On the other hand, in Comparative Examples, it can be seen that the apparent porosities were more than 8.0% thereby having significantly lowered corrosion resistances except for Comparative Example 6. It should be noted here that because Comparative Example 6 did not use the carbon black and/or the pitch, the spalling resistance thereof was not in a level of a practical use.

The invention claimed is:

1. A magnesia carbon brick, the magnesia carbon brick being obtained by adding an organic binder to a refractory raw material mixture followed by kneading, molding, and heat-treating, wherein in the refractory raw material mixture, a pitch and/or a carbon black is included with a total amount of 0.1% or more by mass and 2.0% or less by mass, aluminum and/or aluminum alloy is included with a total amount of 0.1% or more by mass and 1.0% or less by mass, a magnesia having a particle diameter of less than 0.075 mm is included with an amount of 3.0% or more by mass and 10.0% or less by mass, and a magnesia having a particle diameter of 0.075 mm or more and less than 5 mm is included with an amount of 87.0% or more by mass and 96.0% or less by mass, but graphite is not included therein; and a mass ratio of a magnesia having a particle diameter of 1 mm or more and less than 5 mm to a magnesia having a particle diameter of 0.075 mm or more and less than 1 mm is 1.66 or more and 2.34 or less;

and an apparent porosity thereof after having been subjected to a heat-treatment under a reductive atmosphere at 1400° C. for 3 hours is 8.0% or less.

2. The magnesia carbon brick according to claim 1, wherein in the refractory raw material mixture, both the pitch and the carbon black are used together.

3. The magnesia carbon brick according to claim 1, wherein in the refractory raw material mixture, the pitch and/or the carbon black is included with a total amount of 0.2% or more by mass and 1.4% or less by mass.

4. The magnesia carbon brick according to claim 1, wherein in the refractory raw material mixture, the aluminum and/or the aluminum alloy is included with a total amount of 0.1° or more by mass and 0.7% or less by mass.

5. The magnesia carbon brick according to claim 1, wherein in the refractory raw material mixture, the mass ratio of the magnesia having the particle diameter of 1 mm or more and less than 5 mm to the magnesia having the particle diameter of 0.075 mm or more and less than 1 mm is 1.85 or more and 2.20 or less.

6. The magnesia carbon brick according to claim 1, wherein in the refractory raw material mixture, silicon is used with a total amount including the aluminum and/or the aluminum alloy being 0.2% or more by mass and 1.0% or less by mass.

7. A method for producing a magnesia carbon brick, wherein an organic binder is added to a refractory raw material mixture followed by kneading, molding, and heat-treating, the refractory raw material mixture including, without including graphite, a pitch and/or a carbon black with a total amount of 0.1% or more by mass and 2.0% or less by mass, aluminum and/or aluminum alloy with a total amount of 0.1% or more by mass and 1.0% or less by mass, and a magnesia having a particle diameter of less than 0.075 mm with an amount of 3.0% or more by mass and 10.0% or less by mass, and a magnesia having a particle diameter of 0.075 mm or more and less than 5 mm with an amount of 87.0% or more by mass and 96.0% or less by mass; and a mass ratio of a magnesia having a particle diameter of 1 mm or more and less than 5 mm to a magnesia having a particle diameter of 0.075 mm or more and less than 1 mm is 1.66 or more and 2.34 or less.

* * * * *